United States Patent [19]

Komatsu et al.

[11] Patent Number: 5,659,635
[45] Date of Patent: Aug. 19, 1997

[54] IMAGE PROCESSING APPARATUS FOR COMPRESSING AND DECOMPRESSING IMAGE DATA

[75] Inventors: Katsuaki Komatsu; Yuji Tamura, both of Hino, Japan

[73] Assignee: Konica Corporation, Japan

[21] Appl. No.: 417,034

[22] Filed: Apr. 5, 1995

[30] Foreign Application Priority Data

Apr. 26, 1994 [JP] Japan .................................. 6-088685

[51] Int. Cl.$^6$ .................................. H04N 1/40; G06T 9/00
[52] U.S. Cl. .......................... 382/245; 358/426; 358/470; 358/475; 358/448; 358/427; 358/429; 358/456; 341/5.1; 348/409
[58] Field of Search .................................. 358/426, 470, 358/475, 448, 261, 261.1, 261.2, 427, 429, 456, 458, 462; 348/409; 382/232, 181, 166, 245, 246, 244; 341/51

[56] References Cited

U.S. PATENT DOCUMENTS 4,464,650  8/1984  Eastman et al. .................... 340/347
4,558,302  12/1985  Welch .................... 340/347

*Primary Examiner*—Edward L. Coles, Sr.
*Assistant Examiner*—Mark Wallerson
*Attorney, Agent, or Firm*—Jordan B. Bierman; Bierman, Muserlian and Lucas LLP

[57] ABSTRACT

An image processing apparatus for compressing and decompressing image data. The apparatus includes: a composition circuit for composing composed data, having a predetermined bit width, from the given image data which correspond to spatially continuous pixels of an image; a compression circuit for compressing the composed data with Lempel-Ziv algorithm so as to obtain compressed data; a memory for storing the compressed data therein; and a controller for controlling the composition circuit and the compression circuit.

6 Claims, 8 Drawing Sheets

FIG. 6 (B) DATA COMPOSITION OF THE COMPRESSION / DECOMPRESSITION LSI

IMAGE PROCESSING APPARATUS FOR COMPRESSING AND DECOMPRESSING IMAGE DATA

BACKGROUND OF THE INVENTION

The present invention relates to an image processing apparatus, and specifically to a technology for efficiently compressing image data when the image data is stored.

Recently, facsimiles or digital copiers have semiconductor memories or magnetic recording medium for recording image data. Image data read from original documents is not only recorded once, but can be used many times. When image data is recorded in a semiconductor memory or a magnetic recording medium, it is preferable to compress image data as much as possible. The reason for this data compression is that cost for memory, which can be saved by data compression, greatly exceeds the cost for providing additional compression function, for enormous amounts of image data.

There are two data compression methods, a reversible compression method and an irreversible compression method. In the irreversible compression method, a high compression ratio can be obtained if some deterioration of the image is acceptable. However, when a hard copy is used, as in the case of a digital copier or the like, the reversible compression is preferable because characters are mixed with photographs. In this connection, many algorithm have been considered for compressing image data, and an LSI for compressing and decompressing image data has been achieved. For example, a MH (Modified Huffman) method, Huffman algorithm for coding, such as JPEG, and an LZ (Lempel-Ziv) method, or the like, which are used in a facsimile, are realized.

In this connection, because high speed and a large amount of data are generated in the digital copier, or the like, it is necessary for the copier, or the like, to correspond to the compression processing speed of image data, and the amount of the data.

For example, in the digital copier, when the copy speed for A4-sized sheets is 60 pages per minute, the pixel density is 16 dots/mm, and the data width is composed of 8 bits, then, the data rate is about 16 Mbytes/sec. In this case, when an LSI for compression having a compression processing speed of a compression section of 2.0 Mbytes/sec, is used, it is necessary that the data is parallelly processed using 8 LSIs for compression.

Concerning the amount of data, it is preferable to efficiently compress a large amount of image data generated in the copier, or the like, as much as possible to save memory space.

SUMMARY OF THE INVENTION

In view of the foregoing conventional problems, the object of the present invention is to provide an image data compression and decompression processing apparatus by which a large amount of image data, generated at a high speed, is efficiently compressed to save memory space.

In order to accomplish this objective, an image processing apparatus according to the present invention, in which image data, having the predetermined bit width, read from an original document is compressed and stored in a memory, and then data stored in the memory is decompressed and restored to its original state, comprises: a composition means for composing composed data from the image data which correspond to spatially continuous pixels; a compression means for compressing the composed data with a Lempel-Ziv's compression algorithm; a memory means for memorizing the compression data compressed by the compression means; and a control means for controlling the composition means and the compression means.

Further, the image processing apparatus further comprises a bit width conversion means which is controlled by the control means and sets a bit reduction width for a predetermined bit width of image data, and by which image data having a predetermined bit width is converted into the image data, the bit width of which is reduced according to the set bit reduction width, and is outputted to the composition means.

The composition means is structured in such a manner that the number of composed data is increased as the bit reduction width reduced by the bit conversion means is increased; therefore, the number of bits of composed data is always kept equal to a predetermined number.

The control means is structured as follows: the control means controls the bit conversion means so as to set the existence or non-existence of the bit reduction width, and the width of bit reduction, according to a signal for the type of the original document, which is independently set for each original document, corresponding to the types of images in the image data; or alternatively, the control means controls the bit conversion means so as to set the existence or non-existence of the bit reduction width, and the width of bit reduction, according to an area judgement signal independently set for each area corresponding to the types of images in the image data.

A plurality of image data, which are composed by the composition means and the image pixels of the image data are spatially continuous in the primary scanning direction or the subsidiary scanning direction, are converted into composed image data.

Due to the above-described structure, a plurality of data which is spatially continuous are composed and the composed data is compressed by the compression means using the Lempel-Ziv's algorithm, and stored in the memory means.

When repeatedly obtained data is compressed, the Lempel-Ziv's compression algorithm is advantageous for compression ratio and compression processing speed, and is also advantageous for image data, in which a lot of repeated data are contained. Further, when image data of plural image pixels, which are spatially continuous, are composed and compressed by the compression algorithm, the compression ratio and the compression processing speed are further improved.

The bit width conversion means is controlled by the control means and sets the bit reduction width of image data selected from plural predetermined bit widths. Then, the image data is converted into the data in which a predetermined bit width is reduced according to the set bit reduction width, and is outputted to the composition means. Since the bit width is reduced and image data is composed in this way, the compression ratio and the compression processing speed are increased still more.

The larger the bit reduction width reduced by the bit conversion means is the larger the number of image data packed in each composed data. Further, since the number of composed bits is constant, processing becomes easier.

When the bit reduction width is set according to the signal for the types of original documents, the bit reduction width of image data, selected from plural predetermined bit widths, is set. When the original document is composed of, for example, characters, the image quality is not affected even when image data is binarized, so that the compression ratio can be increased.

When the original document contains, for example, half tone image data such as photographs, the compression ratio is decreased, so that deterioration of the image quality can be reduced. As described above, when the types of original documents are selected, the compression ratio corresponding to gradation can also be selected.

When the bit reduction width is set according to the area type signals, the bit reduction width of image data selected from the predetermined bit widths is set, and for example, even when characters and photographs are mixed on the same original document, the data can be compressed so that deterioration of the image quality is smaller.

When the image data is continuous in the primary scanning direction, it is continuous in synchronism with a time flow. Accordingly, image data may be successively composed, and it is not necessary to provide any extra memory for data arrangement.

When image data continuous in the subsidiary scanning direction is treated, it is necessary to provide at least one line memory to store scanned data of 1 line in the primary direction. However, the image data in the subsidiary scanning direction is read by a reading system as it is being moved in the subsidiary scanning direction. Accordingly, the image quality in the subsidiary scanning direction is inferior to that in the primary scanning direction which can be read under the stationary condition of the reading system. Therefore, even when the compression ratio is increased, the influence due to the compression ratio on the deterioration of the image quality is small; therefore, the compression ratio can be increased.

DETAILED DESCRIPTION OF THE INVENTION

Referring to FIG. 1 through FIG. 9, examples of the present invention will be described below.

Figure 1:
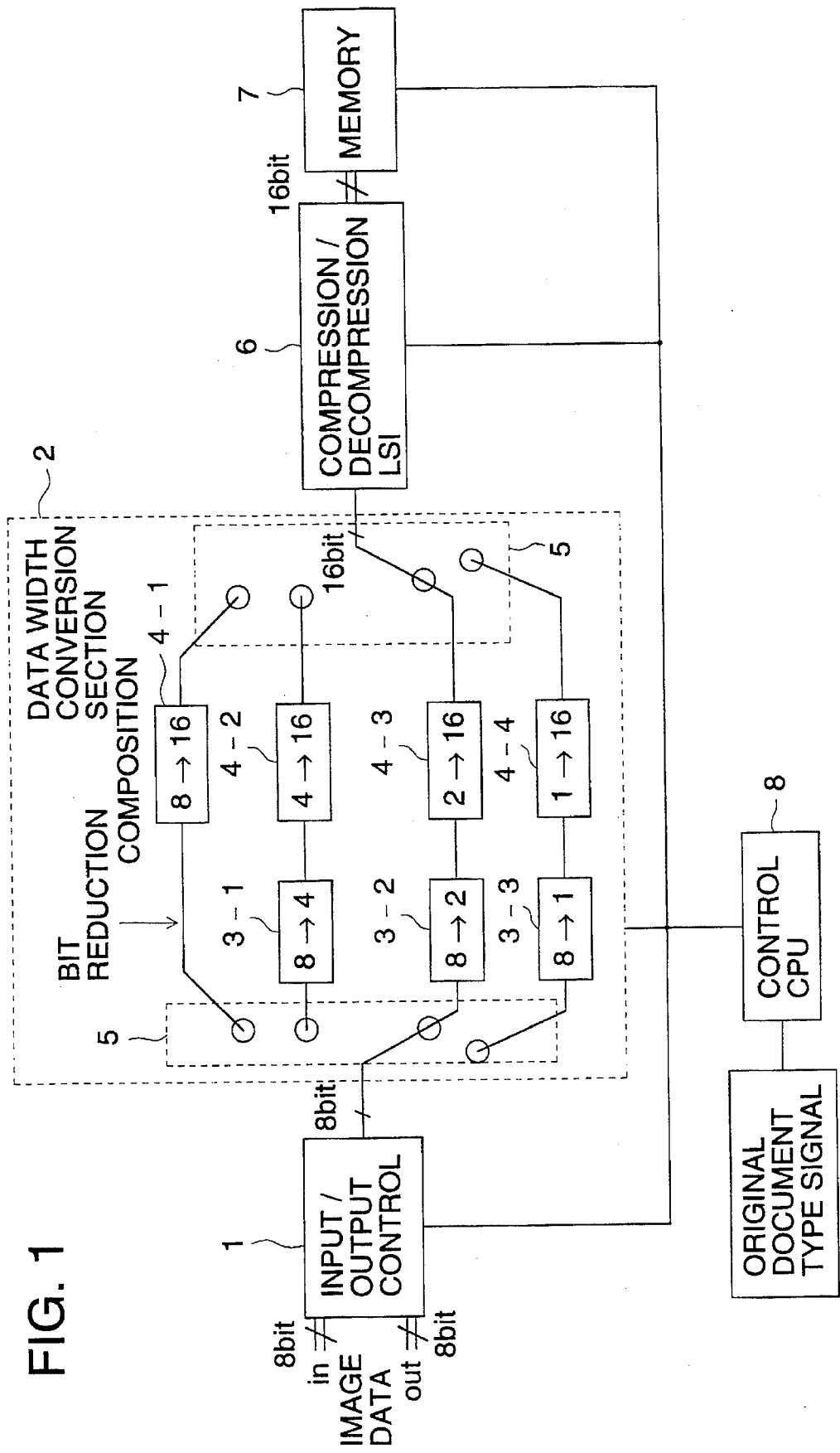
FIG. 1 is a block diagram showing the structure of an example of the present invention.

FIG. 1 is a block diagram of an example of an image processing apparatus according to the present invention. In this image processing apparatus, digital image data having a predetermined bit width, which has been read by the apparatus, is compressed and stored in a memory, and then the stored data is decompressed and regenerated into the original data, for example, as in facsimiles or digital copiers.

In FIG. 1, an input/output control circuit 1 functions as follows. When image data is stored, the image data read by, for example, facsimiles or digital copiers, is outputted to a data width conversion section 2. When the image data is regenerated, data sent from the data width conversion section 2 is outputted to, for example, facsimiles or digital copiers. This image data is spatially continuous, that is, it is continuous in the primary scanning direction or subsidiary scanning direction.

When image data which is continuous in the primary scanning direction, is compressed, image data inputted into the input/output control circuit is successively outputted to the data width conversion section 2. When image data which is continuous in the subsidiary scanning direction, is compressed, image data including more than 1 line is temporarily stored in a memory, and then it is outputted to the data width conversion section 2. Accordingly, when the image data which is continuous in the subsidiary scanning direction, is compressed, it is necessary to provide a line memory in which image data scanned by at least 1 scanning operation can be stored.

The data width conversion section 2 is composed of bit reduction circuits 3-1 through 3-3, composition circuits 4-1 through 4-4, and a change-over switch 5.

Figure 2:
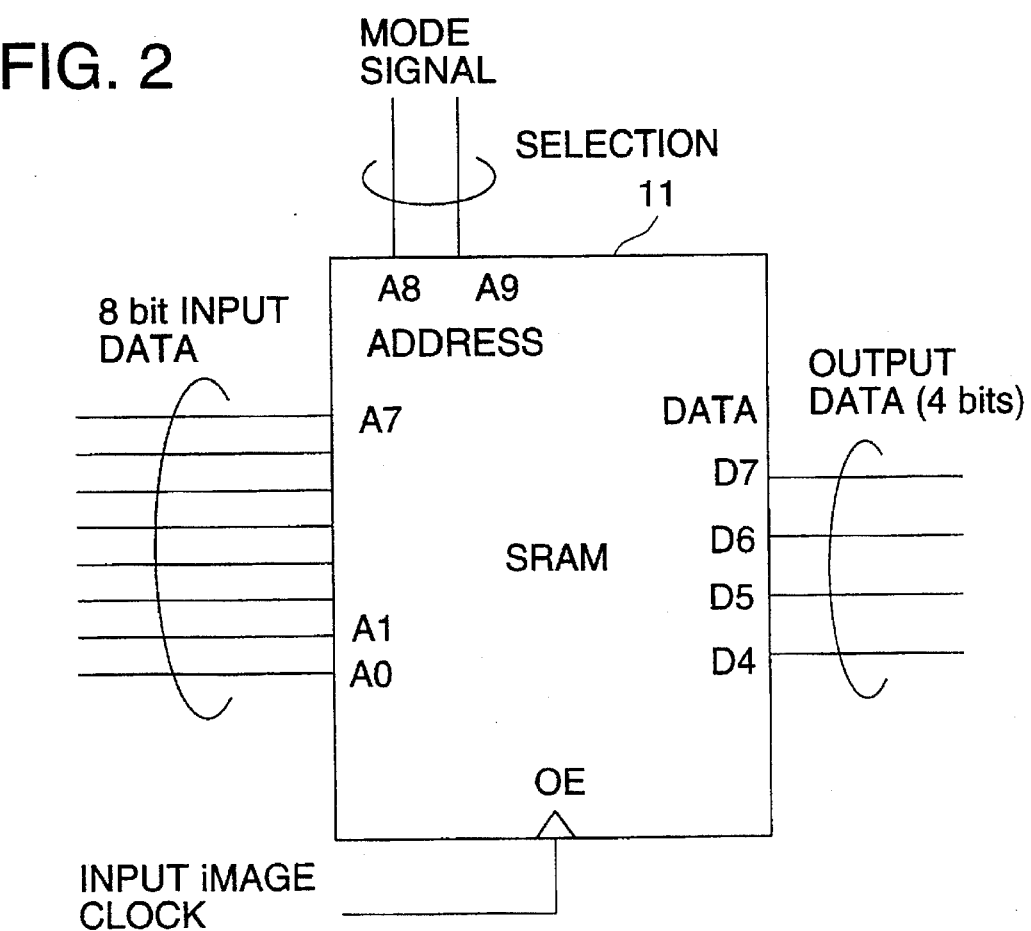
FIG. 2 is an explanatory drawing showing an example of the structure of a bit reduction circuit shown in FIG. 1.
Figure 3:
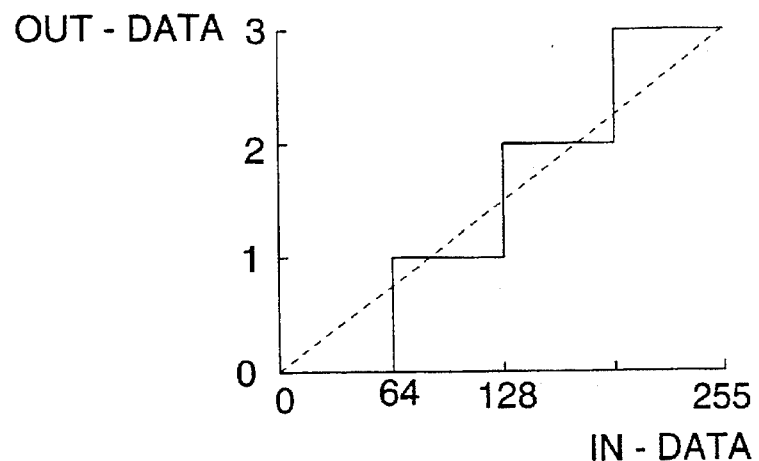
FIG. 3 is an explanatory drawing showing an example of a bit reduction operation shown in FIG. 1.

Bit reduction circuits 3-1 through 3-3 reduce bit width of 8 bit data, and reversibly convert it to 4, 2, and 1 bit respectively. The bit reduction circuit is composed of, for example, an SRAM in which a look-up table is stored. In this connection, image data is directly inputted into the composition circuit 4-1, or any of bit reduction circuits 3-1 through 3-3 is selected, according to the set bit reduction width. Setting of the bit reduction width will be described after. FIG. 2 shows the bit reduction circuit 3-1 by which 8 bit data is converted into 4 bit data, and 4 bit conversion data is previously written in the SRAM 11. Then, when 8 bit data is inputted into the bit reduction circuit 3-1 according to an image clock signal, the data read from an address corresponding to the input data is outputted as 4 bit converted data. FIG. 3 shows an example of the bit width reduction by which 8 bit input data (IN-DATA) is converted into 2 bit output data (OUT-DATA). For example, when 8 bit input data is not more than [63], 2 bit data [0] is outputted. These bit reduction circuits 3-1 through 3-3 correspond to a bit width conversion means.

The composition circuit 4 is composed of the composition circuit 4-1 by which two 8 bit image data are reversibly composed without additional operation, and composition circuits 4-2 through 4-4 by which image data, composed of not less than 4 pixels, in which the bit width of 8 bit image data is reduced, is reversibly composed into 16 bit data. When the bit reduction width is set, any one of composition circuits 4-1 through 4-4 is unconditionally determined corresponding to the set bit reduction width.

Figure 4:
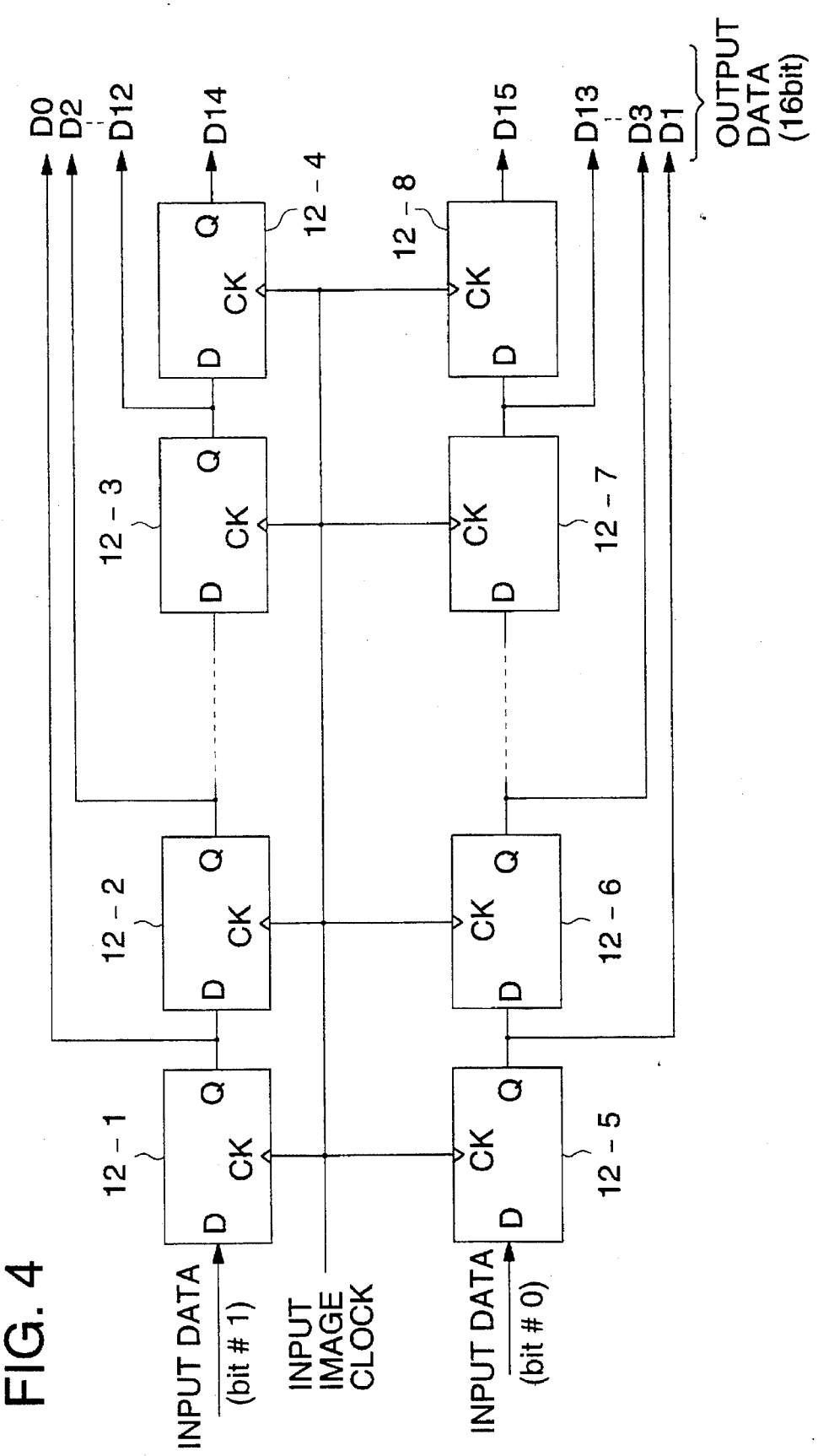
FIG. 4 is an example of the structure of a composition circuit shown in FIG. 1.
Figure 5:
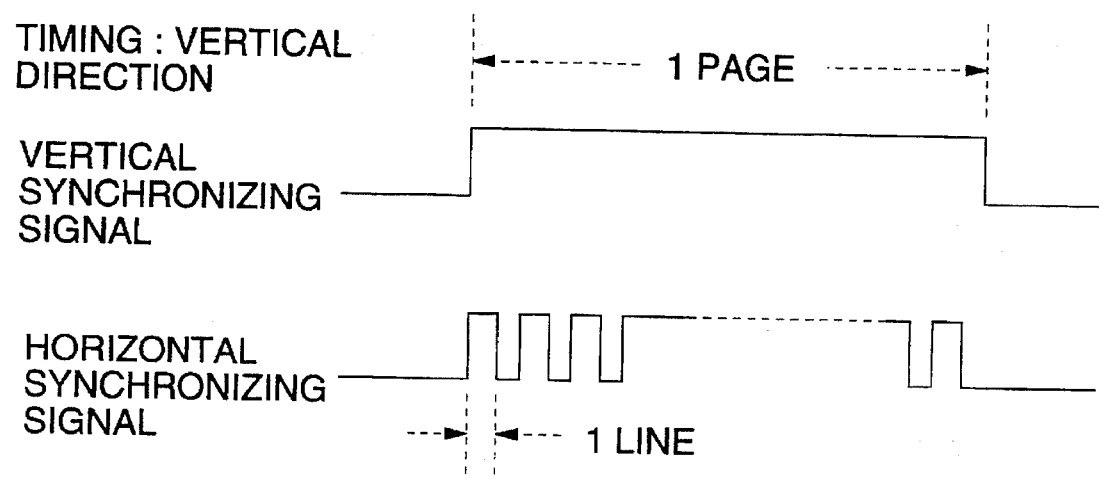
FIG. 5 is a timing chart at the time when image data is inputted into an input/output control circuit.
Figure 6:
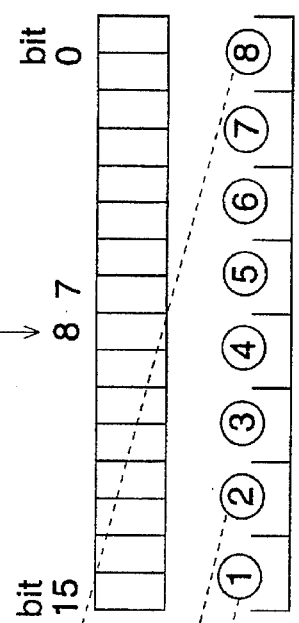
FIGS. 6(A), 6(B) and 6(C) are explanatory drawings of the data composition operation.
Figure 6:
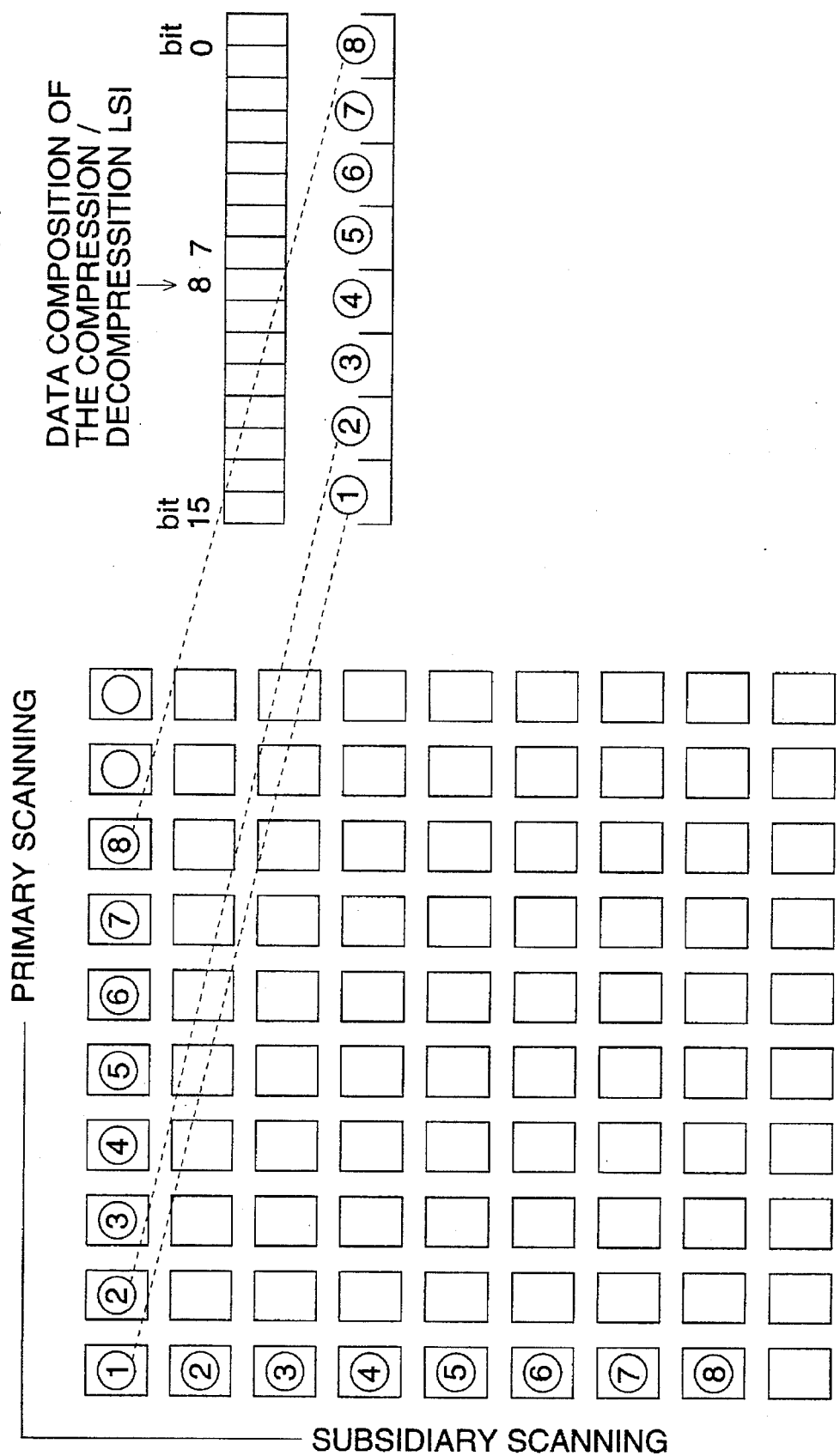
Figure 6:
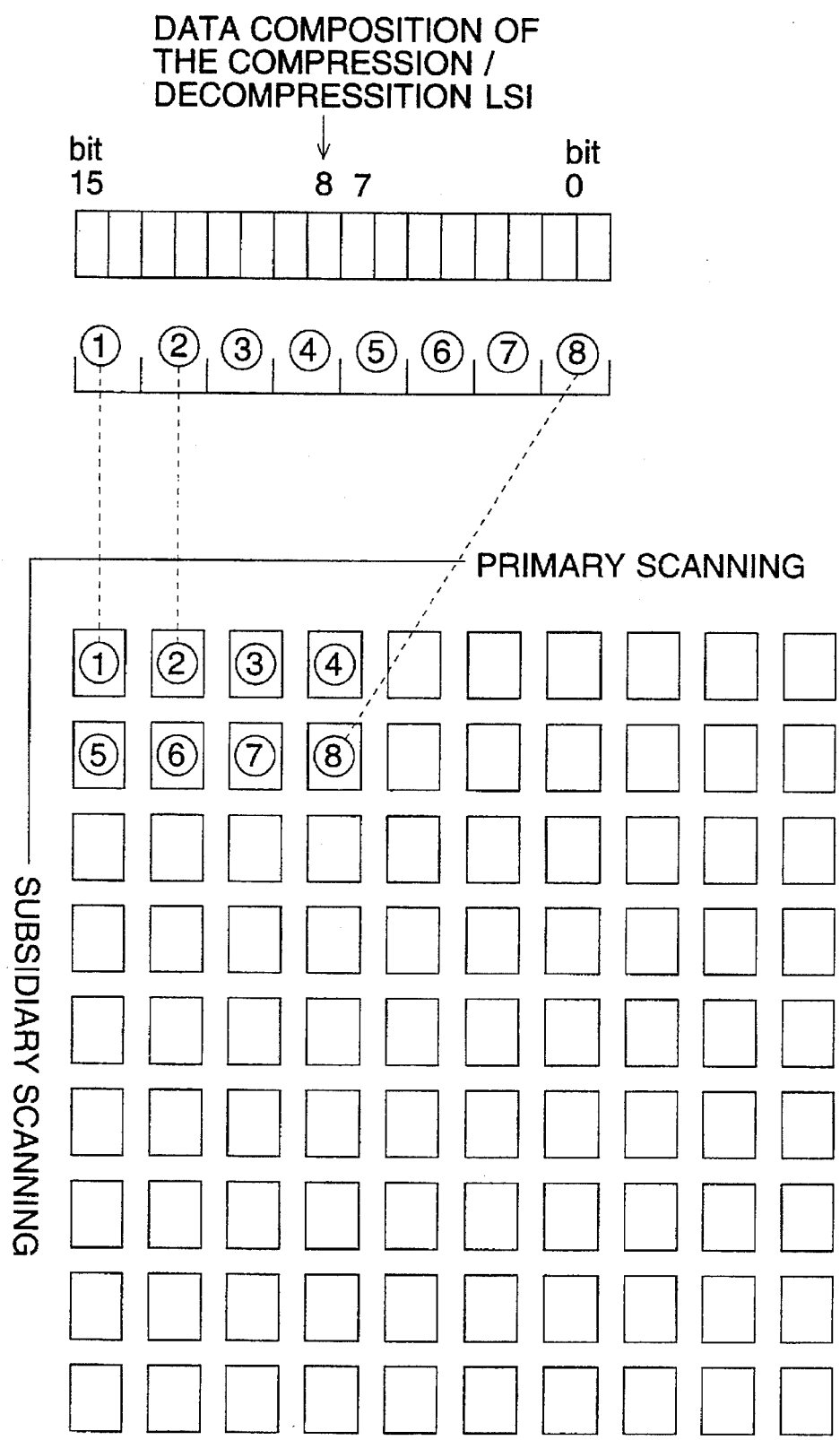

FIG. 4 shows the composition of, for example, the 2 bit data composition circuit 4-3. In FIG. 4, the composition circuit 4-3 is composed of D-flip flop circuits 12-1 through 12-8, and composes a total of 8 data of bits #0, and #1, which are inputted in timed relationship with the input image clock, to 16 bit data of D0 through D15, and outputs it. Other composition circuits are also structured by similar circuits.

These composition circuits 4-1 through 4-4 correspond to a composition means.

Switching of bit reduction circuits 3-1 through 3-3, and composition circuits 4-1 through 4-4 is carried out when a control CPU 8 controls the change-over switch 5.

A compression/decompression LSI 6 compresses any of 16 bit output data outputted from a selected circuit of composition circuits 4-1 through 4-4, and when decompression processing is carried out, data stored in a memory 7 is decompressed. This circuit corresponds to a compression means.

To this compression/decompression method, Lempel-Ziv's compression algorithm is applied (refer to Japanese Patent Publication Open to Public Inspection No. 68219/19991). In this algorithm, an inputted character string is compared with the previously processed character string, and compression processing is carried out when the longest string, in which the inputted character string is equal to the previously processed character string, is found and coded. In this algorithm, since the repetition of the data string is regarded as noticeable and the repeated data string is compressed, when a lot of data are repeated, the compression ratio is increased, which is advantageous.

In the compression/decompression LSI 6, actually inputted data which is arranged within the bus width, corresponds to 1 [character]. Because image data spatially adjoin each other, there is a possibility that these data are correlated with each other. Accordingly, when a case where data of a plurality of pixels are composed and compressed using this Lempel-Ziv's compression algorithm, is compared with a case where data of 1 pixel is processed as [a character] without any additional operation, image data can be more efficiently compressed in the former case.

The memory 7 stores this compressed data. This memory corresponds to a memory means.

The control CPU 8 controls the input/output control circuit 1, the compression/decompression LSI 6, and the memory 8. The CPU 8 also controls the change-over switch 5, and selects bit reduction circuits 3-1 through 3-3, and composition circuits 4-1 through 4-4, according to the inputted original document type signal. In this connection, this original document type signal is a signal for designating that, for example, the original document read by a digital copier is a document including mainly characters, or the document including a half-tone image such as photographs. This signal is manually set, for example, by an operation button on the copier. This control CPU 8 corresponds to a control means.

Next, compression processing will be described below.

For example, in facsimiles or digital copiers, the image is read at high speed, and 8 bit image data to be recorded, which is synchronized with a vertical synchronizing signal for 1 page, and a horizontal synchronizing signal for 1 line, is inputted into the input/output control circuit 1. When the image data is composed of 8 bits, an image having 256 gradations can be recorded.

In the case where image data which is continuous in the primary scanning direction, is compressed, the image data is successively outputted to the data width conversion section 2. In the case where image data which is continuous in the subsidiary scanning direction, is compressed, the image data including not less than 1 line of data is temporarily stored in the input/output control circuit, and then outputted to the data width conversion section 2 so that the data is continuous in the subsidiary scanning direction.

In the data width conversion section 2, the following are set: the bit width of the inputted image data composed of 8 bits is reduced, or not reduced; and in the case where the bit width is reduced, into which bit data of 1, 2, or 4 bit data the image data is converted. This bit reduction width is determined by the scanning direction of data to be compressed, or the original document type signal which is inputted from a digital copier main body, printer, or the like, into the control CPU 8.

Concerning the scanning direction of data to be compressed, since the image in the primary scanning direction can be read in the stationary status, the image quality is superior. In contrast to this, since the image data is read while the image data is being moved in the subsidiary scanning direction, the image quality in the subsidiary scanning direction is inferior to that in the primary scanning direction. Accordingly, even when the compression ratio is greater, deterioration of the image quality is not greatly affected. Therefore, when the image data is continuous in the primary scanning direction, the bit reduction width is reduced. Reversely, when image data is continuous in the subsidiary scanning direction, the bit reduction width is increased corresponding to the image quality of the image data.

Regarding the conversion method of the image data of 8 bits, it is possible to reduce the depth of gradation, as necessitated, by a simple conversion that 8 bit data (256 gradations) is applied to a predetermined bit width. For example, when 8 bit data is converted to 1 bit data (binary conversion), 8 bit data is converted to 0 as it is less than a predetermined threshold value and it is converted to 1 as it is not less than the predetermined threshold value. In such the case, the threshold value can be determined as a matter of design.

Accordingly, such the simple conversion is effective when the subject image for the conversion is nothing to do with gradation information such as that of characters; however, the conversion becomes necessary to provide a certain data bit width when the image contains the gradation information to be reserved such as that of pictures.

Concerning the types of original documents, the bit reduction width is set corresponding to gradations of the original documents. For example, when the original document includes mainly characters such as newspaper, the image data is binarized. That is, the bit reduction width of 7 is selected, and 8 bit data is converted into 1 bit data. In the case of such an original document, even when the image data is binarized, the image quality is not greatly deteriorated, and the compression ratio (the amount of initial data/the amount of compressed data) is higher. On the other hand, in the case where it is judged that the half tone image data on the original document should be maintained, for example, as on photographs, when the bit reduction width is made larger and 8 bit data (256 gradations) is converted into 1 bit data, the half tone can not be maintained and the image quality deteriorates. Accordingly, in this case, the bit reduction ratio is reduced, 8 bit data is not converted, or converted into 4 bit data. For example, when the image data has 256 gradations, 8 bits are necessary for 1 pixel, in order to express the image, and therefore the bit reduction width is 0. When the image data on the original document has 16 gradations, the image can be expressed by 4 bits for 1 pixel, and therefore, the bit reduction width for 1 pixel is 4.

For the conversion method for bit width reduction, other than the afore mentioned simple conversion, it is possible to use continuous tone quantization methods such as dither pattern method and dot pattern method.

When the bit reduction width is determined, the change-over switch 5 is switched.

When the bit reduction width is 0, the composition circuit 4-1 is selected so that the image data does not pass through the bit reduction circuit. Due to the above operations, 8 bit image data is inputted into the composition circuit 4-1, and two 8 bit data are composed, and 16 bit data is formed.

When the bit reduction width is not less than 1, any of bit reduction circuits 3-1 through 3-3 is selected. In this connection, when any of bit reduction circuits 3-1 through 3-3 is selected, one of composition circuits 4-2 through 4-4 is absolutely determined. That is, the larger the bit reduction width is, the larger is the number of data to be composed. The number of bits of the composed data is 16.

In the embodiment of the present invention, the selection of the bit reduction circuits is conducted each time for every document. The pixel number of the image data corresponding to the document is preset to a predetermined number so that the composed data, having the bit width of 16, is evenly filled with the image data for the entire image of the document. Therefore, regardless of the selection from the composition circuits of 4-1 through 4-4, the image data converted by the bit reduction circuits is constantly packed as the composed data of 16 bit width.

Moreover, it is possible to divide a whole image to plural image areas, and to process the image data, corresponding to each of the image areas, with a respective bit reduction circuit which applies a different number of reduction bit width from other circuits. In this case, it is more effective that the composed data, having a bit width of 16, is filled with the image data corresponding only to the same image area by arranging the pixel number of the image area to be able to do so than that the data, converted by 2 or more different bit reduction circuits, are mixed and packed as a composed data of 16 bits. In other words, since all the image data, corresponding to one image area, are composed by the same composition circuit so as to have the same bit width, it is easier to handle the composed data, as they only consist of the data though the same bit reduction circuit, when they are compressed and decompressed to be restored.

When the bit width is reduced and composed, 8 bit image data is inputted into the bit reduction circuit which is selected from bit reduction circuits 3-1 through 3-3 and the bit width is converted. Then, the image data is inputted into the corresponding composition circuit, and is composed to 16 bit data.

Figure 7:
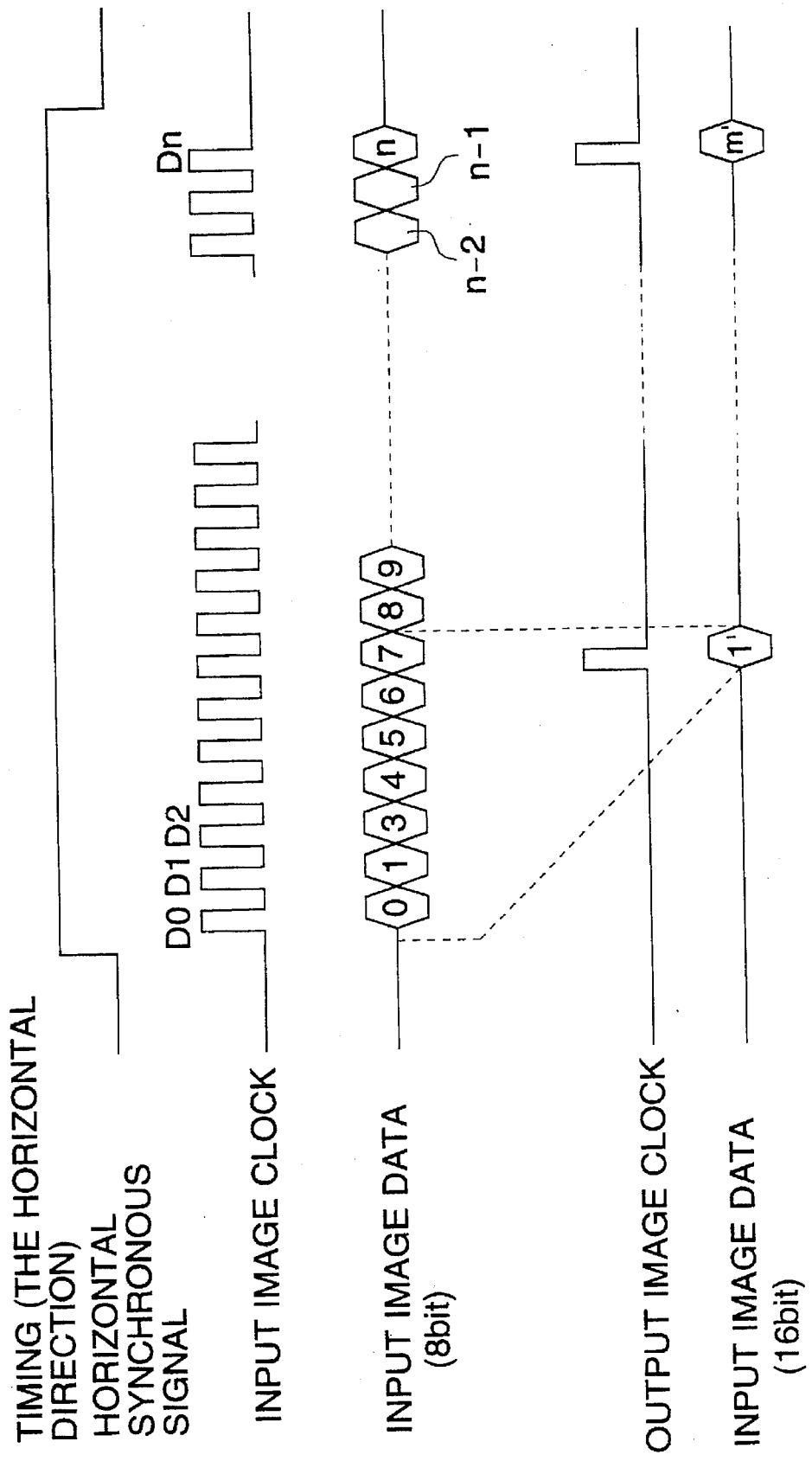
FIG. 7 is a timing chart showing a compression processing operation shown in FIG. 1.

FIGS. 6(A) and 6(B) show an example in which 8 bit image data composed of spatially continuous pixels is converted into 2 bit data, and is composed to 16 bit data. In FIG. (A), the bit width of 8 bit image data composed of pixels which are continuous in the primary scanning direction or in the subsidiary scanning direction, is reduced by the bit reduction circuit 3-2, and the image data is converted into 2 bit data. Then, this 2 bit data is composed to 16 bit data as shown in FIG. 6(B). A timing chart of the above operations is shown in FIG. 7. The image data for 1 line which is inputted into the data width conversion section 2, is inputted into the bit reduction circuit in timed relationship with the input image clock signal, and is converted into 2 bit data. Then, the image data for 8 pixels are integrated and composed to 16 bit data. This composed 16 bit data is outputted to the compression/decompression LSI 6 through the change-over switch 5 in timed relationship with the output image clock.

FIGS. 6(A).and 6(B) describe that the continuous pixels of the image data are continued in line either in the primary scanning direction or in the subsidiary scanning direction; however, it is possible to make the continuous pixels continue spatially for plural pixels both in the primary scanning direction and the subsidiary scanning direction as shown in FIG. 6(C). For example, when image data of 1 pixel is converted to 2 bit data, the image data of 8 pixels, which continue for 4 pixels in the primary scanning direction and for 2 pixels in the subsidiary scanning direction, can be composed as the composed data of 16 bits as in the same manner described in FIGS. 6(A) and 6(B).

In the compression/decompression LSI 6, the image data is coded to a 16 bit data row according to the LZ's compression algorithm. The conversion speed in the compression/decompression LSI 6 is approximately constant with respect to the inputted data content. Therefore, when data is composed, the apparent conversion speed of the image data is increased. For example, in the case where the processing speed of the compression/decompression LSI is 10M words/s at maximum, when data is not composed, only 10M pixels of the image data are processed per second. However, when data is composed, 20M pixels can be processed per second, even if 256 gradations of the image data remain unchanged.

This coded data is stored in the memory 7.

In this connection, when the image data is regenerated, the processing sequence is reversed to the compression processing sequence. In this case, the data stored in the memory 7 is decompressed by the compression/decompression LSI 6, restored to the original image data in the data width conversion section 2, and outputted from the input/output circuit 1.

Due to the above structure, when the bit width of the image data having a spatially continuous and predetermined bit width is reduced, and the image data is compressed using the Lempel-Ziv's compression algorithm after the image data has been composed to 16 bit data, the following advantages can be realized: the compression ratio can be increased more than in cases where the same compression algorithm is simply used; a large amount of image data generated at high speed are efficiently compressed; and the memory space can be saved. Further, the effective processing speed is increased; the period of time necessary for the data compression can be reduced; and an inexpensive low speed memory can be used.

As afore mentioned, it is more effective to compress the image data continued in the subsidiary scanning direction than that in the primary scanning direction. However, for processing the image data in the subsidiary scanning direction, it is necessary to provide the high accessing speed memory, such as SRAM, for at least 1 primary scanning line so as to simultaneously process the image data of at least 2 primary scanning lines. Therefore, the cost of the configuration becomes a considerable matter when the image data, corresponding to the many continuous pixels in the subsidiary scanning direction, is to be obtained.

However, when the image data, corresponding to the continuous pixels in the subsidiary scanning direction, is compressed, the effectivity of the compression becomes higher than the case of the continuous pixels in the primary scanning direction and the space of memory 7, necessitated for storing the image data after the compression, is caused to be minimized. Accordingly, when the configuration of the apparatus is to store a large volume of the image data after the compression, it is possible to save a large space in memory 7 by providing a relatively small volume of line memory to the composition circuits. On the other hand, when the configuration of the apparatus is to store a relatively small volume of the image data after the compression, the effectivity of the compression becomes imbalanced with the cost of the line memory; therefore, it is rather preferable to apply the compression to the image data corresponding to the continuous pixels in the primary scanning direction.

Further, when the number of bits of the image data which is continuous in the primary scanning direction, is reduced, and the image data is composed and compressed, the image data can be compressed without using a line memory.

Still further, when the number of bits of the image data which is continuous in the subsidiary scanning direction, is reduced, and the image data is composed and compressed, the compression ratio can be increased, although a line memory is necessary.

Further, when the type of the original document is judged and the bit reduction width is set, the bit reduction width is decreased in the case of the halftone original document such as photographs, and the bit reduction width is increased in the case of the original character document on which characters are mainly written, so that the deterioration of the image quality can be suppressed, and the compression ratio can be increased in the case of the original character document.

In this example, the bit reduction width is set corresponding to the document type signals inputted into the control CPU 8. The document type signals include image type information whether the image on the document mainly consists texts or it does picture information. Alternatively, the bit reduction width may be set corresponding to the image type on the area read by an area discrimination means provided in the apparatus. The area discrimination means Generates area type signals to identify the image type of the area by which the bit reduction width is set.

Figure 8:
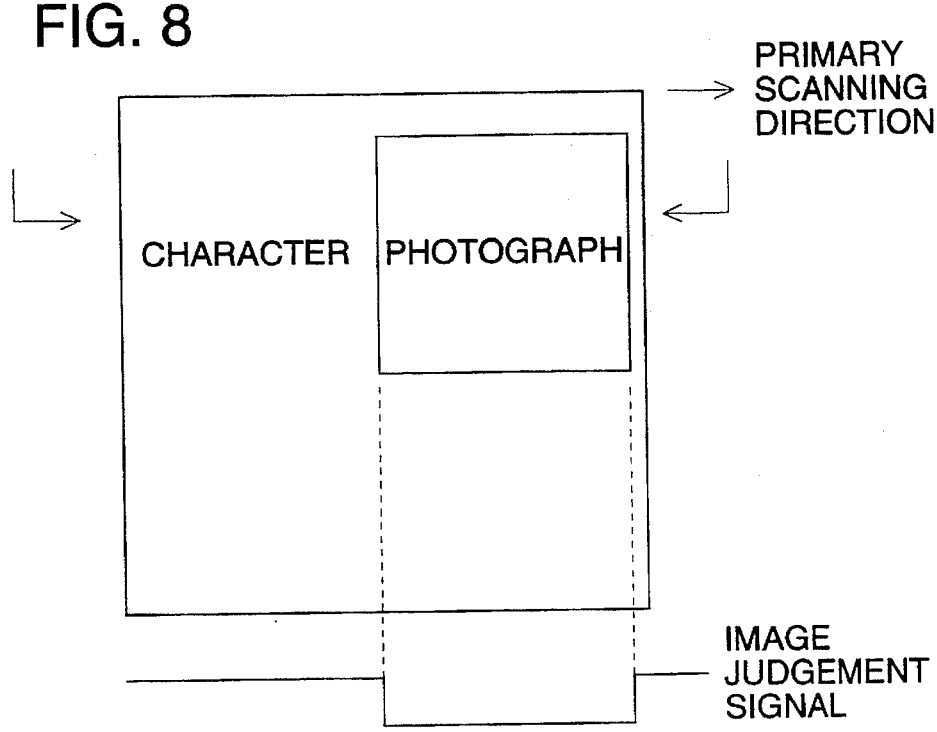
FIG. 8 is an explanatory drawing of an image judgement operation.

For example, as shown in FIG. 8, when the area on which characters are mainly written, is read, the bit reduction width is set so that it is increased, and when a photograph area is read, the bit reduction area is set so that it is decreased.

In order to realize the above-described technology, the area judgement signal is inputted into the control CPU 8, and bit reduction circuits 3-1 through 3-3, and composition circuits 4-1 through 4-4 are selected corresponding to the area judgement signal.

Due to this technology, even when characters and photographs exist on the same original document, the compression ratio of the image data corresponds to the character area and the image area, and deterioration of the image quality is suppressed and image data can be compressed.

Figure 9:
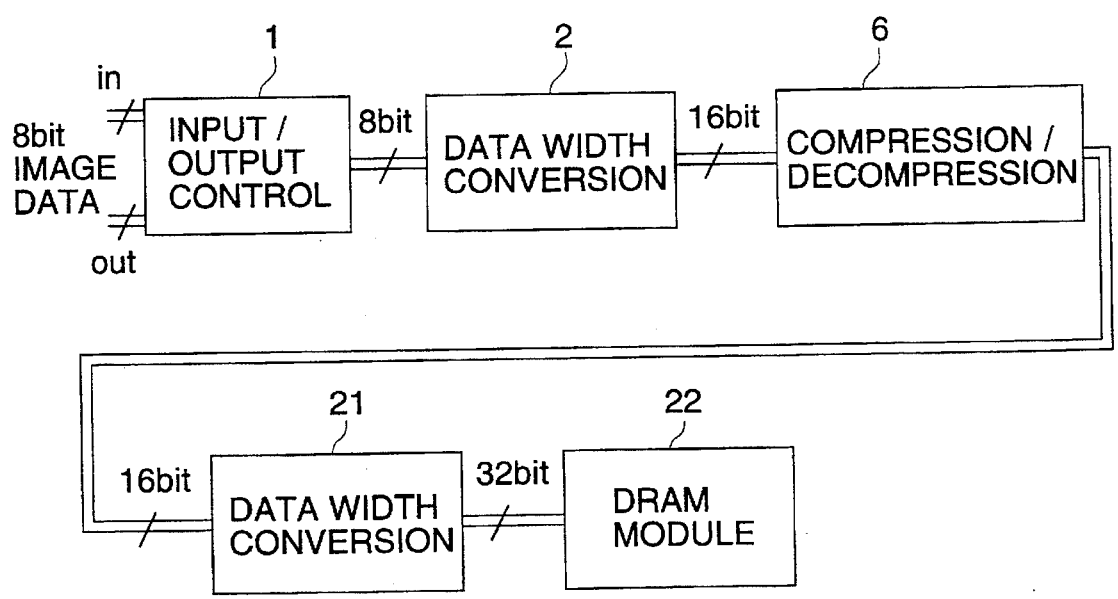
FIG. 9 is a view showing the structure of another example of the present invention.

Next, as shown in FIG. 9, 16 bit data outputted from the compression/decompression LSI 6 may be converted to 32 bit data in the data width conversion section 21, and stored in, for example, a DRAM module 22.

Due to the above technology, for example, when an image data rate is 20 MHz, the write cycle time of the memory may be 200 ns while the image data cycle time is 50 ns, so that an inexpensive low speed memory can be used, which is advantageous.

As described above, in the image processing apparatus according to the present invention, when a plurality of image data which are spatially continuous, are composed, and compressed by the Lempel-Ziv's compression algorithm, a higher compression ratio can be obtained, the memory space can be saved, and further, the effective processing speed is increased, and the period of time for the data compression can be reduced.

When image data is converted into the data in which the predetermined bit width is reduced, and composed, the compression ratio and the compression processing speed can be further increased.

The larger the bit reduction width is, the larger is the number of data to be composed, and the compression ratio can be increased.

In the case where the bit width is reduced according to the original document type signal, when the original document includes mainly characters, the compression ratio can be increased without affecting the image quality, and when the original document includes mainly halftone data such as photographs, the deterioration of the image quality can be suppressed at the time of data compression. Accordingly, the type of original document is selected and the compression ratio can be selected corresponding to gradations.

In the case where the bit width of the image data having the predetermined bit width is reduced according to the area judgement signal, even when characters and photographs are mixed on the same original document, the image data can be compressed so that the deterioration of the image quality is suppressed.

When the image data is continuous in the primary scanning direction, since the image data may be successively compressed, the image data can be compressed without using a memory.

When the image data is continuous in the subsidiary scanning direction, the compression ratio is further increased.

What is claimed is:

1. An image processing apparatus for compressing and decompressing image data, comprising:

a plurality of bit reduction means each for reducing a bit width of said image data pixel by pixel to respective one of a plurality of different predetermined bit widths;

a plurality of composition means each for receiving said image data from respective one of said plurality of bit reduction means, and each for composing composed data from said image data which correspond to spatially continuous pixels;

wherein said composed data consists of said image data having one of said plurality of different predetermined bit widths;

a compression means for compressing said composed data with a Lempel-Ziv algorithm so as to obtain compressed data;

a memory means for storing said compressed data therein; and a control means for controlling said bit reduction means, said composition means and said compression means;

wherein said control means selects one of said plurality of bit reduction means so that a selected one of said plurality of bit reduction means reduces said bit width of every pixel of said image data to respective one of said plurality of different predetermined bit widths.

2. The apparatus of claim 1, wherein said composed data has a predetermined bit width regardless of a selection from said plurality of bit reduction means by said control means.

3. The apparatus of claim 1, further comprising:

a generating means for generating document type signals including image type information of said image data;

wherein said control means selects one of said plurality of bit reduction means according to said document type signals.

4. The apparatus of claim 1, further comprising:

an area discrimination means for discriminating an area having a same type of image in said image data, and for generating area type signals including image type information of said area;

wherein said control means selects one of said plurality of bit reduction means according to said area type signals.

5. The apparatus of claim 1, wherein said spatially continuous pixels continue in line either in a primary scanning direction or in a subsidiary scanning direction of said image data.

6. The apparatus of claim 1, wherein said spatially continuous pixels continue spatially for a plurality of pixels both in a primary scanning direction and in a subsidiary, scanning direction of said image data.

* * * * *